(12) United States Patent
Shachor et al.

(10) Patent No.: US 8,695,919 B2
(45) Date of Patent: Apr. 15, 2014

(54) AERIAL UNIT AND METHOD FOR ELEVATING PAYLOADS

(75) Inventors: Gabriel Shachor, Maccabim Reut (IL);
Shy Cohen, Yokneam moshava (IL);
Ronen Keidar, Yokneam moshava (IL)

(73) Assignee: Sky Sapience Ltd., Yokneam (IL)

( * ) Notice: Subject to any disclaimer, the term of this patent is extended or adjusted under 35 U.S.C. 154(b) by 0 days.

(21) Appl. No.: 13/814,244

(22) PCT Filed: Nov. 10, 2011

(86) PCT No.: PCT/IB2011/055021
§ 371 (c)(1),
(2), (4) Date: Apr. 17, 2013

(87) PCT Pub. No.: WO2012/063220
PCT Pub. Date: May 18, 2012

(65) Prior Publication Data
US 2013/0214088 A1    Aug. 22, 2013

Related U.S. Application Data

(60) Provisional application No. 61/412,816, filed on Nov. 12, 2010.

(51) Int. Cl.
*B64C 27/08* (2006.01)
*B64C 27/54* (2006.01)

(52) U.S. Cl.
USPC ............... 244/17.17; 244/17.11; 244/17.19; 244/17.21; 244/17.23; 244/23 C

(58) Field of Classification Search
USPC .......... 244/17.17, 17.11, 17.23, 17.21, 17.19, 244/17.25, 23 C
See application file for complete search history.

(56) References Cited

U.S. PATENT DOCUMENTS

| | | | | |
|---|---|---|---|---|
| 4,795,111 | A * | 1/1989 | Moller | 244/23 C |
| 7,497,759 | B1 * | 3/2009 | Davis | 446/454 |
| 7,510,142 | B2 * | 3/2009 | Johnson | 244/17.17 |
| 8,322,648 | B2 * | 12/2012 | Kroetsch et al. | 244/17.23 |
| 2006/0226281 | A1 * | 10/2006 | Walton | 244/17.23 |
| 2009/0283629 | A1 * | 11/2009 | Kroetsch et al. | 244/17.23 |
| 2010/0243794 | A1 * | 9/2010 | Jermyn | 244/17.23 |
| 2012/0241553 | A1 * | 9/2012 | Wilke | 244/17.13 |

* cited by examiner

*Primary Examiner* — Tien Dinh
*Assistant Examiner* — Michael Wang
(74) *Attorney, Agent, or Firm* — Oren Reches

(57) ABSTRACT

An aerial unit includes a connecting element arranged to connect a ground unit to the aerial unit. The ground unit may include a connecting element manipulator, for altering an effective length of the connecting element and a ground unit controller for controlling the connecting element manipulator. A positioning unit is arranged to image the aerial unit and to generate metadata about a location of the aerial unit. An interfacing module is provided for coupling a payload to the aerial unit. At least one of the ground unit and the aerial unit may include a controller that is arranged to control, at least in response to the metadata, at least one of a first propeller motor and at least one steering element to affect at least one of the location of the aerial unit and the orientation of the aerial unit.

15 Claims, 12 Drawing Sheets

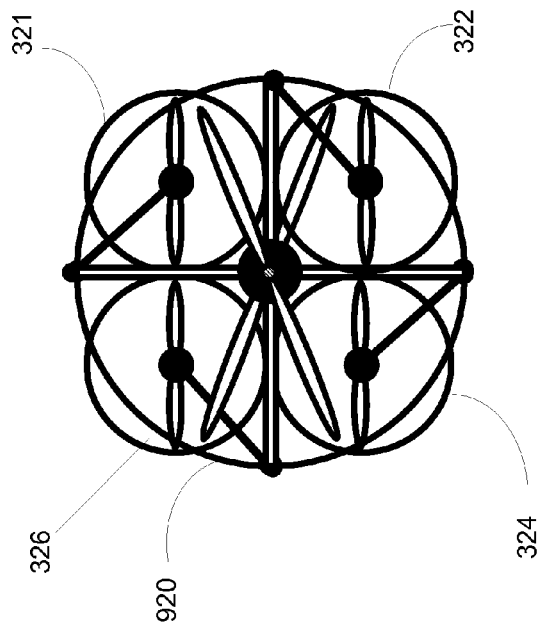
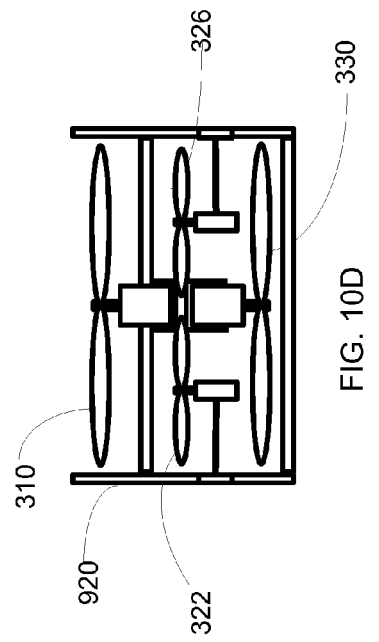
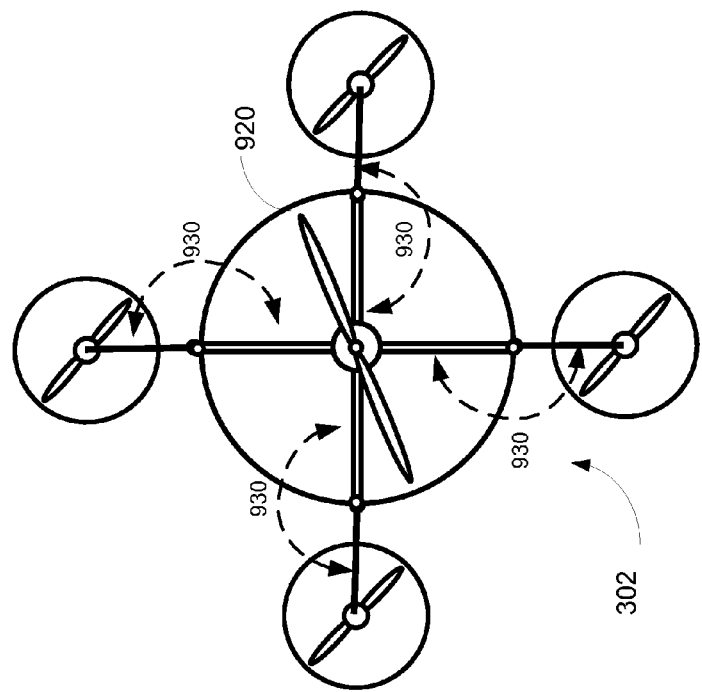
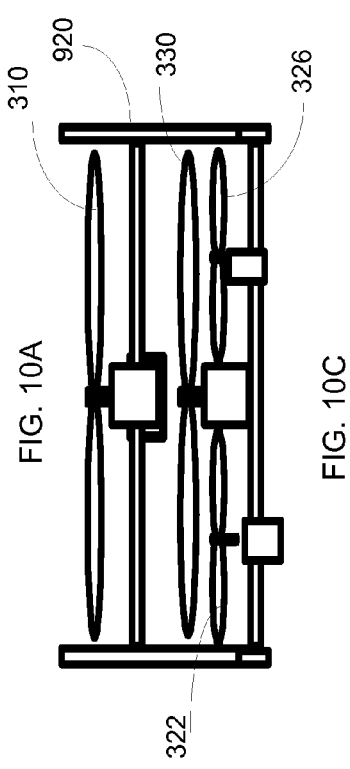
FIG. 10B
FIG. 10D
FIG. 10A
FIG. 10C

AERIAL UNIT AND METHOD FOR ELEVATING PAYLOADS

RELATED APPLICATIONS

This application claims the priority of U.S. provisional patent 61/412816 filing date Nov. 12, 2010 which is incorporated herein by reference.

FIELD OF THE INVENTION

The invention relates to systems, aerial units and method for elevating payloads by the aerial unit.

BACKGROUND OF THE INVENTION

Prior art of height observation and signaling equipment (such as observation cameras) are connected to a base unit by using a mast made of rigid metal construction or other stiff materials that supports the equipment.

The mast implements large moments on the base due to its significant height. For example, every single Kg force of wind pressure at the top of a 30 meter height mast will implement a moment of about 30 Kg at one meter on the platform, and a pressure of about 150 Kg on a typical 20 cm diameter base construction. Thus, a heavy duty vehicle is required to support the equipment with its supporting construction.

In addition, the process of lifting the equipment to the destined altitude is time consuming and requires a team work. Tactic balloons and masts suffer from long spreading time, long folding time, large size (about 1 cubic meter of Helium for 300 gram of payload and balloon), bad stability and require highly trained operators.

There is a need for a simpler system and method for lifting equipment for height observation or signaling such as an observation camera.

SUMMARY

According to an embodiment of the invention a system is provided and may include a ground unit; an aerial unit; and a connecting element arranged to connect the ground unit to the aerial unit. The ground unit may include a connecting element manipulator, for altering an effective length of the connecting element, the effective length of the connecting element defines a distance between the ground unit and the aerial unit; a ground unit controller for controlling the connecting element manipulator; and a positioning unit arranged to image the aerial unit and to generate metadata about a location of the aerial unit. The aerial unit may include a first propeller; a frame; a first propeller motor that is configured to rotate the first propeller about a first axis, the first propeller motor is connected to the frame; and at least one steering element. At least one of the ground unit and the aerial unit may include a controller that is arranged to control, at least in response to the metadata, at least one of the first propeller motor and the at least one steering element to affect at least one of the location of the aerial unit and the orientation of the aerial unit.

The positioning unit may include a single video camera.

The positioning unit may include multiple video cameras and at least two optical axes of at least two video cameras are oriented in relation to each other.

The positioning unit may include a video camera that may be proximate to point in which the connecting element may be connected to the grouped unit.

The positioning unit may include a video camera that may be remotely positioned from the connecting element manipulator.

The positioning unit may include an image processor that may be arranged to determine a location of the aerial unit in relation to a desired location, and generate location metadata indicative of position corrections that should be made to position the aerial unit at the desired location.

The connecting element may be a flexible cable that may be maintained in a tensed status while the aerial unit may be in the air.

The aerial unit may be arranged to maneuver in relation to the flexible cable, when the flexible cable may be maintained in the tensed status.

The system may include a connector that couples the flexible cable to the aerial unit while allowing the aerial unit to move in relation to the flexible cable.

The system may include an interface electronic unit that may be positioned below the connector and may be arranged to send power and commands to the first motor.

The system may include a second propeller that may be arranged to rotate about a second axis; the first and second axes are concentric.

The frame may at least partially surround the propeller.

The system may include additional propellers and additional propeller motors that are arranged to rotate the additional propellers; each additional propeller may be positioned outside the frame; the controller may be further arranged to control the additional propeller motors.

The additional propellers may be arranged in a symmetrical manner around the first propeller.

The additional propellers are smaller than the first propeller.

The additional propeller motors and the first propeller motor form a group of propeller motors; and the controller may be arranged to independently control at least two propeller motors out of the group of propeller motors.

The controller may be arranged to independently control each propeller motor of the group of propeller motors.

The controller may be arranged to control one additional propeller motor to rotate in a clockwise manner and control another additional propeller motor to rotate in a counterclockwise manner.

The at least one steering element may include the additional propellers.

The controller may be arranged to alter at least one of a location and an orientation of the aerial unit by controlling a thrust of at least two propellers of a group of propellers that may include the additional propeller and the first propeller.

The controller may be arranged to perform yaw steering by controlling the first propeller and at least one steering element that differs from the additional propellers; the controller may be arranged to perform pitch and roll steering by controlling at least two additional propellers.

The controller may be arranged to perform yaw steering by controlling a thrust of first propeller and a thrust of at least one steering element that differs from the additional propellers; the controller may be arranged to perform pitch and roll steering by controlling thrusts of at least two additional propellers.

The system may include a group of propellers that may include the first propeller, four additional propellers and a second propeller that rotates about a second axis that may be concentric to the first axis; three propellers of the group of propellers rotate clockwise and three other propellers of the group rotate counter clockwise.

The controller may be arranged to control a change of at least one of a location and orientation of the aerial unit by altering at least one thrust of at least one propeller of the group while maintaining directions of rotation of the propellers of the group unchanged.

The positioning unit may be arranged to generate location metadata about a location of the aerial unit and the aerial unit may include an orientation sensor arranged to generate orientation metadata about the orientation of the aerial unit.

The metadata may include location metadata and orientation metadata and the controller may be arranged to control, at least in response to the metadata the at least one of the first propeller motor and the at least one steering element to affect at least one of the location of the aerial unit and the orientation of the aerial unit.

The frame at least partially surrounds the propeller; the system may include additional propellers and additional propeller motors that are arranged to rotate the additional propellers; each additional propeller may be positioned outside the frame; the controller may be further arranged to control the additional propeller motors; and the additional propeller motors are connected to additional frames; the additional frames are coupled to the frame by coupling elements that allow movement between the frame and the additional frames.

The coupling elements may facilitate a movement of the additional frames from a close condition to an open condition; when the additional frames are in an open condition the additional frames and the frame do not overlap and when the additional frames are in a close condition the additional frames and the frame overlap.

An aerial unit can be provided and may include a first propeller; a frame; a first propeller motor that may be configured to rotate the first propeller about a first axis. The first propeller motor may be connected to the frame; an interfacing module for coupling a payload to the aerial unit; additional propellers and additional propeller motors that are arranged to rotate the additional propellers; each additional propeller may be positioned outside the frame.

The additional propellers may be arranged in a symmetrical manner around the first propeller.

The additional propellers may be smaller than the first propeller.

The additional propeller motors and the first propeller motor may form a group of propeller motors; and the aerial unit may include a controller that may be arranged to independently control at least two propeller motors out of the group of propeller motors.

The controller may be arranged to independently control each propeller motor of the group of propeller motors.

The controller may be arranged to control one additional propeller motor to rotate in a clockwise manner and control another additional propeller motor to rotate in a counterclockwise manner.

The controller may be arranged to alter at least one of a location and an orientation of the aerial unit by controlling a thrust of at least two propellers of a group of propellers that may include the additional propeller and the first propeller.

The controller may be arranged to perform yaw steering by controlling the first propeller and at least one steering element that differs from the additional propellers; the controller may be arranged to perform pitch and roll steering by controlling at least two additional propeller.

The controller may be arranged to perform yaw steering by controlling a thrust of first propeller and a thrust of at least one steering element that differs from the additional propellers; the controller may be arranged to perform pitch and roll steering by controlling thrusts of at least two additional propellers.

The aerial unit may include a group of propellers that may include the first propeller, four additional propellers and a second propeller that rotates about a second axis that may be concentric to the first axis; three propellers of the group of propellers rotate clockwise and three other propellers of the group rotate counter clockwise.

The aerial unit may include a controller that may be arranged to control a change of at least one of a location and orientation of the aerial unit by altering at least one thrust of at least one propeller of the group while maintaining directions of rotation of the propellers of the group unchanged.

The positioning unit may be arranged to generate location metadata about a location of the aerial unit and the aerial unit may include an orientation sensor arranged to generate orientation metadata about the orientation of the aerial unit.

The metadata may include location metadata and orientation metadata and the controller may be arranged to control, at least in response to the metadata the at least one of the first propeller motor and the at least one steering element to affect at least one of the location of the aerial unit and the orientation of the aerial unit.

The frame at least partially surrounds the propeller; the system may include additional propellers and additional propeller motors that may be arranged to rotate the additional propellers; each additional propeller may be positioned outside the frame; the controller may be further arranged to control the additional propeller motors; and the additional propeller motors may be connected to additional frames; the additional frames may be coupled to the frame by coupling elements that allow movement between the frame and the additional frames.

the coupling elements facilitate a movement of the additional frames from a close condition to an open condition; when the additional frames may be in an open condition the additional frames and the frame do not overlap and when the additional frames may be in a close condition the additional frames and the frame overlap.

According to an embodiment of the invention a method for controlling an aerial unit may be provided and may include tracking a location of an aerial unit by a positioning unit that does not belong to the aerial unit; determining the relationship between an actual location of the aerial unit and a desired location; and sending to the aerial unit positioning commands that affect the location of the aerial unit.

The method can be applied on an aerial unit that includes a first propeller; a frame; a first propeller motor that may be configured to rotate the first propeller about a first axis, wherein the first propeller motor may be connected to the frame; an interfacing module for coupling a payload to the aerial unit; and additional propellers and additional propeller motors that are arranged to rotate the additional propellers; wherein each additional propeller may be positioned outside the frame.

BRIEF DESCRIPTION OF THE DRAWINGS

Further features and advantages of the invention will be apparent from the description below. The invention is herein described, by way of example only, with reference to the accompanying drawings, wherein:

FIGS. 10A-10D are general views of aerial units of systems according to embodiments of the invention;

DETAILED DESCRIPTION OF THE DRAWINGS

A system is provided. The system may be used for height spreading of observation, signaling equipment, antennas, transmission relay station, anti-terrorist surveillance, and the like. The system may be a light, compact and portable and may include a ground unit and an aerial unit. The aerial unit orientation and location (displacement) may be controlled within four degrees of freedom while maintaining a built-in stability thereof. The system may be automatically and easily deployed and folded.

Various applications can use the system, for example: observation, height photographing, a reception/transmission relay, spot marking (by a projector or laser), antennas etc.

Various embodiments of systems 100-106 are illustrated in FIGS. 1-7. Systems 100, 102, 103, 104 and 105 of FIGS. 1,3,4,5 and 6 are illustrated as including a single video camera 232.

Figure 2:
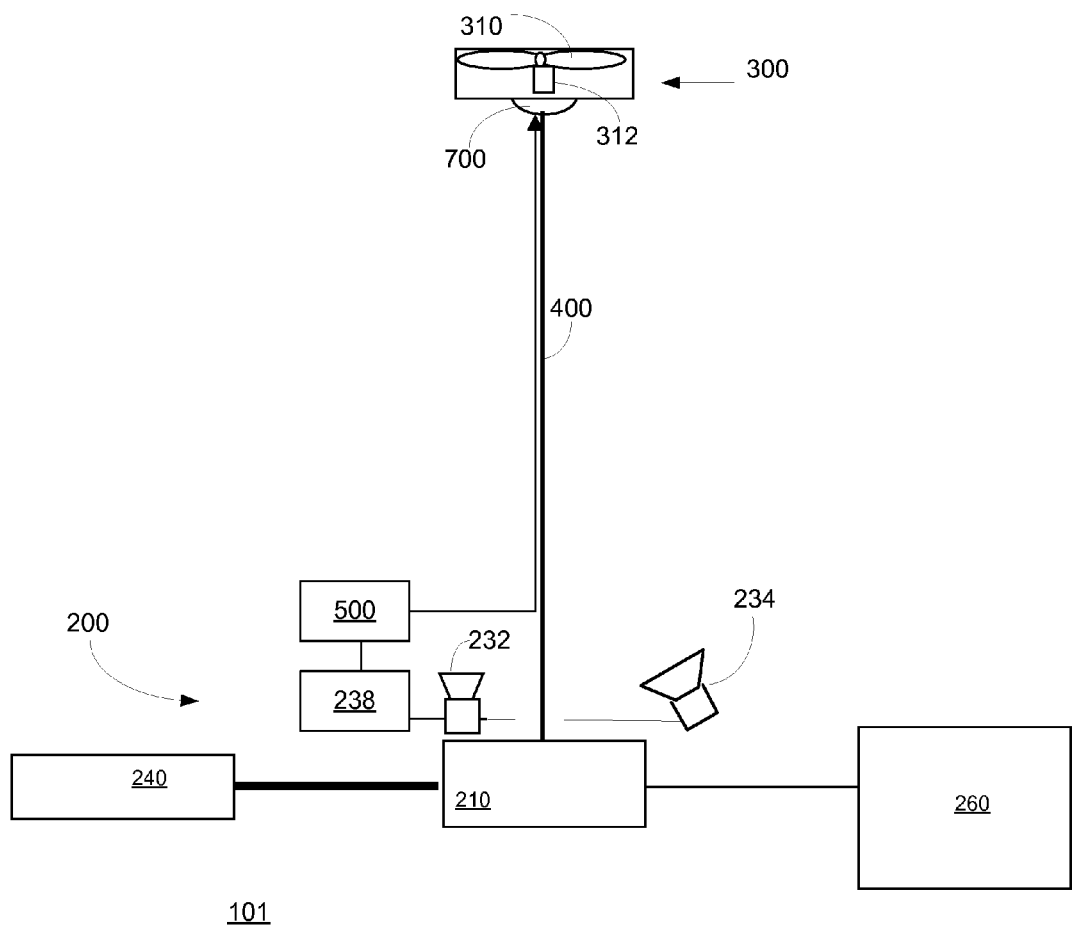
FIG. 2 is a general view of a system according to an embodiment of the invention.
Figure 7:
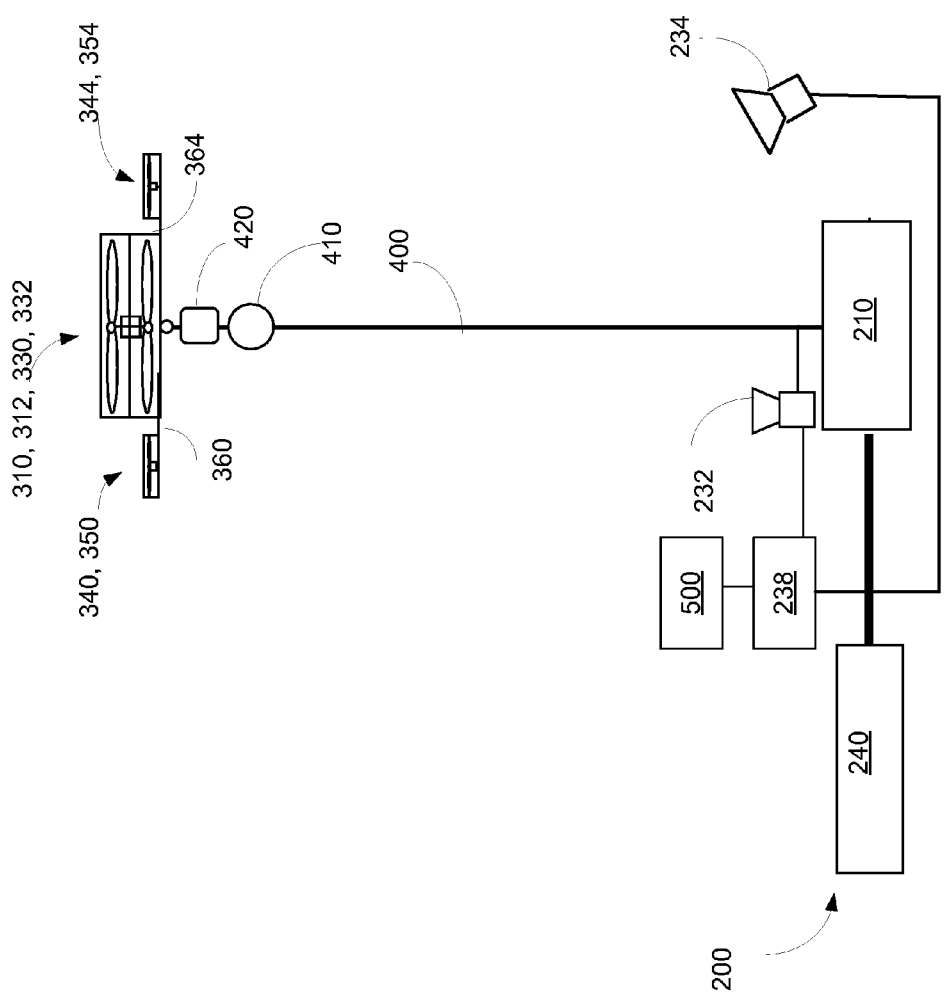
FIG. 7 is a general view of a system according to an embodiment of the invention.
Figure 8:
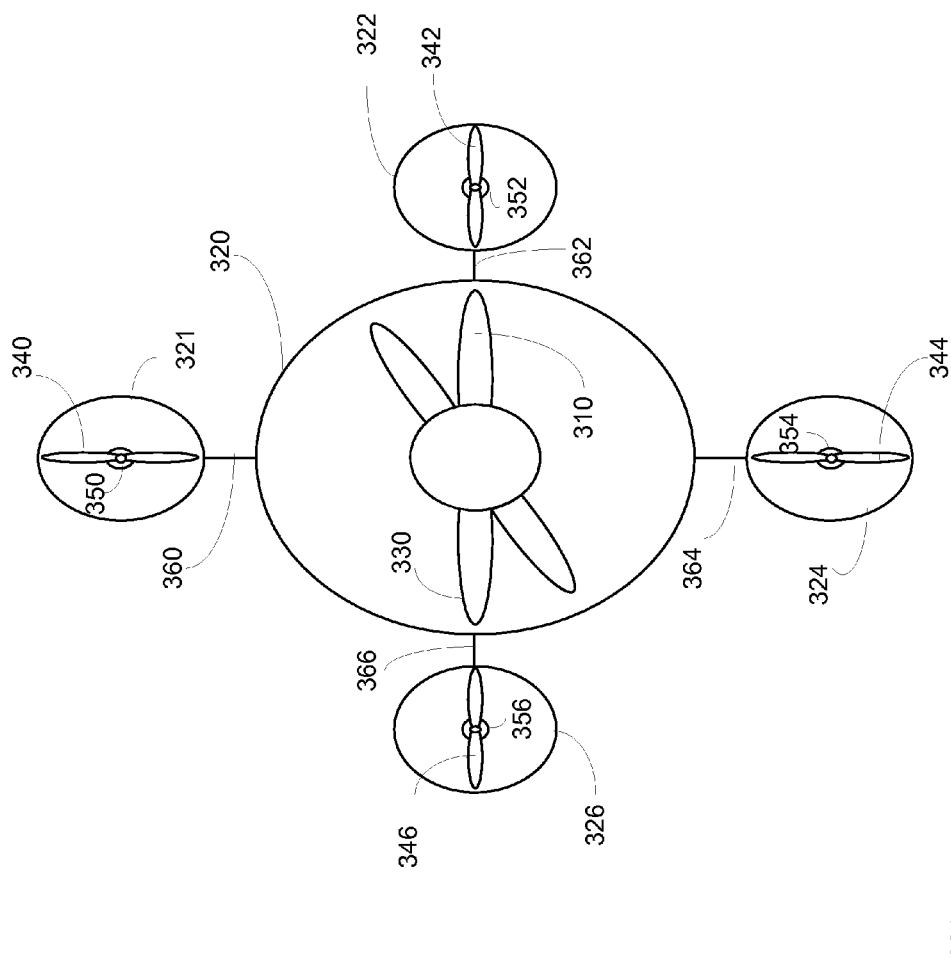
FIG. 8 is a general view of an aerial unit of a system according to an embodiment of the invention.

Systems 101 and 106 of FIGS. 2 and 7 have two video cameras 232 and 234. It is noted that each system can have more than two video cameras.

Systems 100, 101, 102 and 104 of FIGS. 1, 2, 3 and 5 are illustrated as having an aerial unit with a single propeller 310 (and also include a steering element that may be a second propeller and is not shown).

Figure 4:
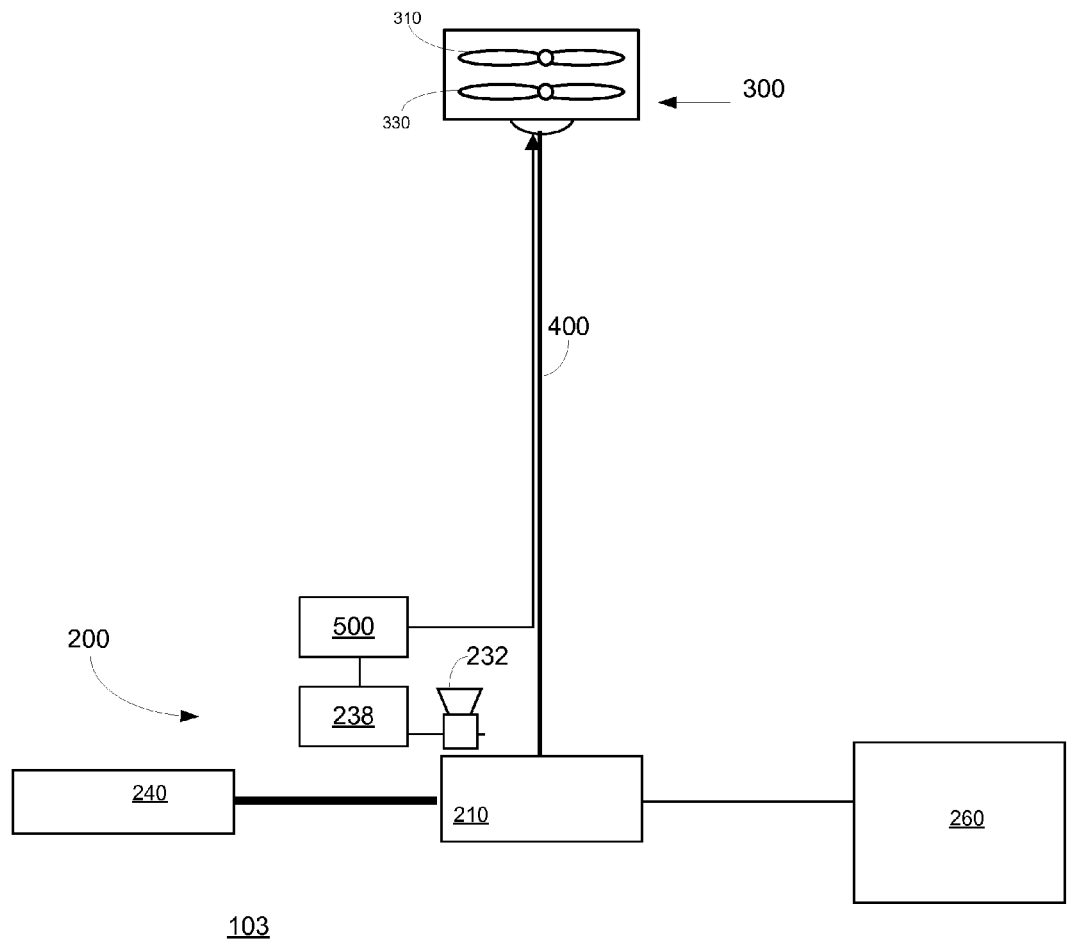
FIG. 4 is a general view of a system according to an embodiment of the invention.

System 103 of FIG. 4 has a pair of propellers 310 and 330 that rotate about concentric axes.

Figure 6:
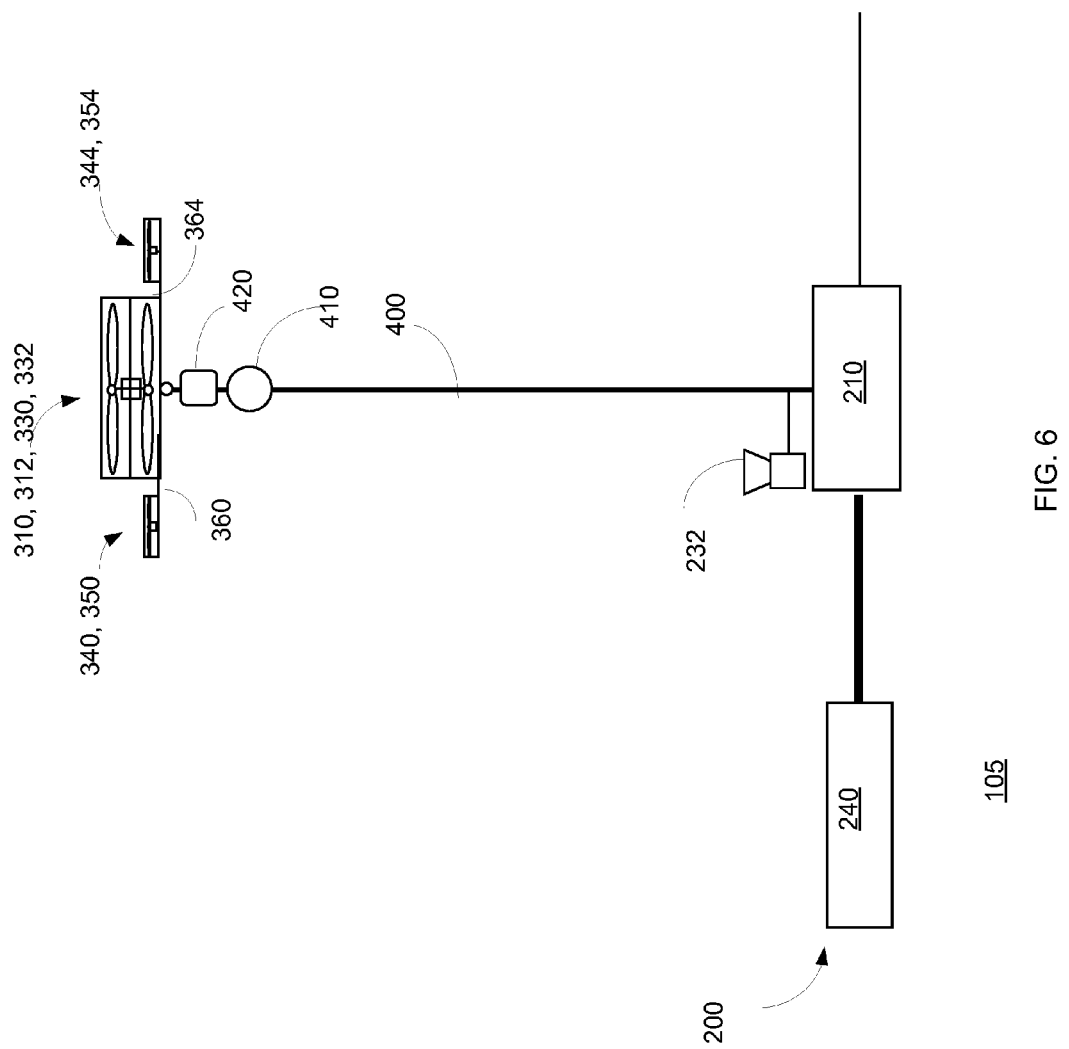
FIG. 6 is a general view of a system according to an embodiment of the invention.

Systems 105 and 106 of FIGS. 6 and 7 include a pair of "main" propellers 310 and 330 as well as additional propellers 340, 342, 344 and 346.

Figure 3:
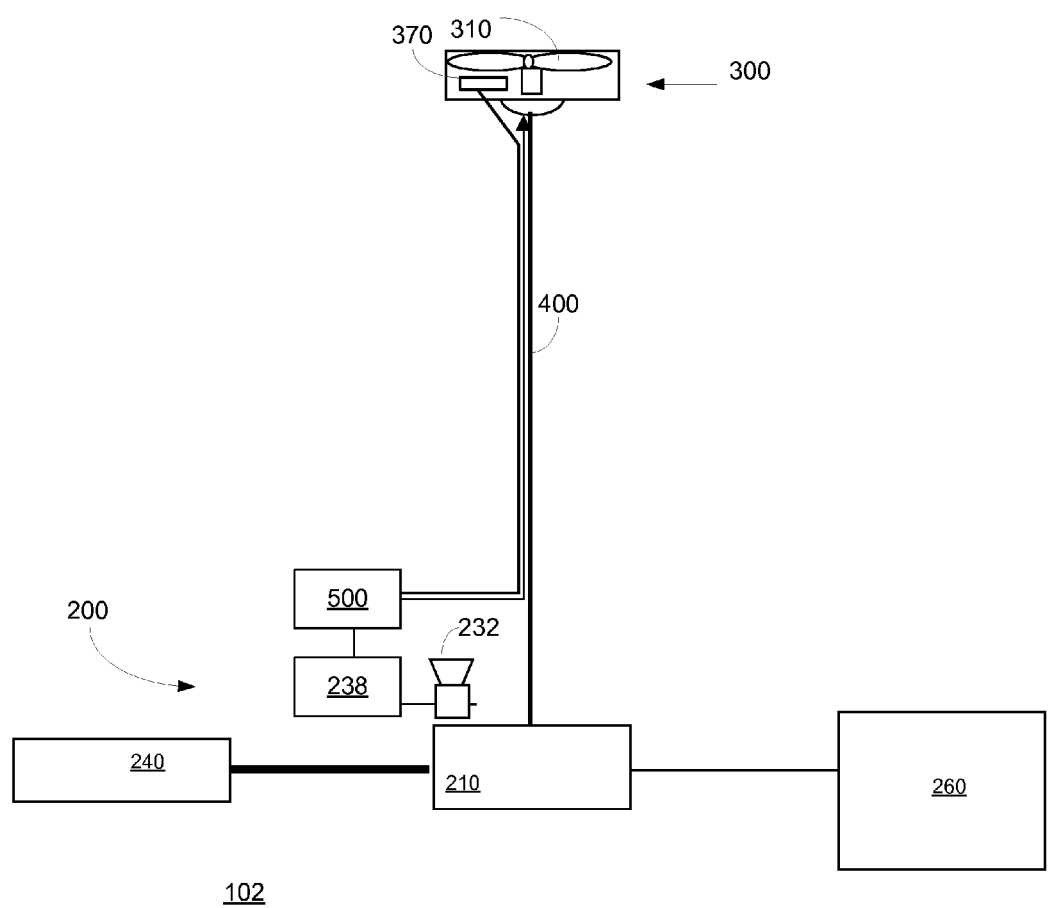
FIG. 3 is a general view of a system according to an embodiment of the invention.

System 102 of FIG. 3 is illustrates as having an aerial unit that includes an orientation sensor 370.

Figure 11:
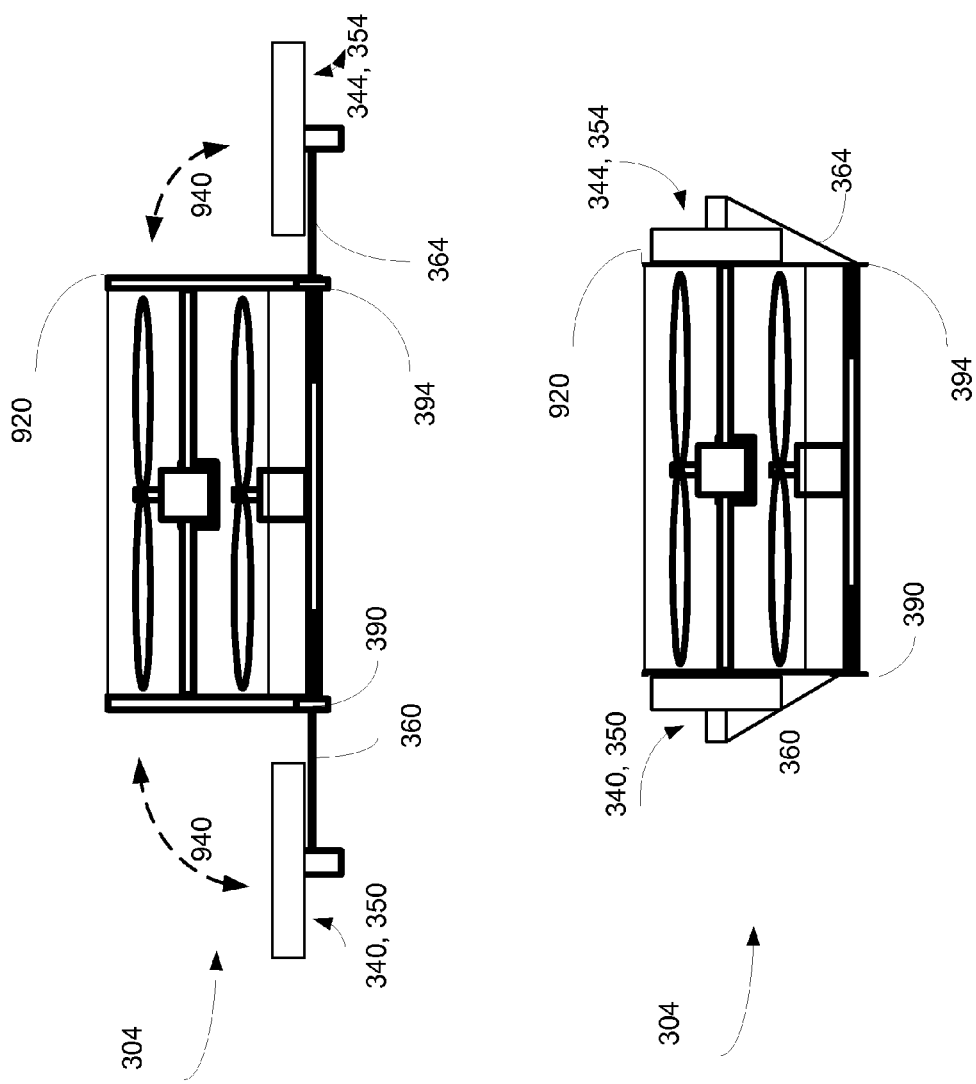
FIG. 11 is a general view of an aerial unit of a system according to an embodiment of the invention.

Aerial units 301, 302 and 304 of FIGS. 8-11 are illustrates as including a pair of propellers as well as four additional propellers. These figures illustrate different folding arrangements of the four additional propellers. FIGS. 10A-10D illustrate a rotation within an imaginary horizontal plane while FIG. 11 illustrates a rotation within a vertical plane. FIG. 10A is a top view of aerial unit 302 at an open configuration. FIG. 10B is a top view of aerial unit 302 at a closed configuration. FIG. 10C is a side view of aerial unit 302 at a closed configuration where the additional propellers (for example 322 and 326) are located below the first and second propellers 310 and 330. FIG. 10D is a side view of aerial unit 302 at a closed configuration where the additional propellers (for example 322 and 326) are located between the first and second propellers 310 and 330.

Any combination of components of each of the systems can be provided. The same applies to the aerial unit. For example, any one of systems 101-107 can be equipped with any of the aerial units 300, 302 and 304. Yet for another example, each system can include one or more video cameras, one or more orientation sensors and the like.

A system may be provided and may include a ground unit 200, an aerial unit 300, 302 and 304 and a connecting element 400 arranged to connect the ground unit 200 to the aerial unit 300, 302 and 304.

The ground unit 200 may include a connecting element manipulator 201, a base 202 and a ground unit controller 203 (collectively denoted 210).

The connecting element manipulator 201 is for altering an effective length of the connecting element 400. The effective length of the connecting element 400 defines a distance between the ground unit 200 and the aerial unit 300, 302 and 304.

The connecting element 400 can be a flexible cable that is maintained in a tensed status while the aerial unit 300, 302 and 304 is in the air.

The aerial unit 300, 302 and 304 can be arranged to maneuver in relation to the flexible cable, when the flexible cable is maintained in the tensed status.

The Flexible cable may include an electrical cable and a communication cable. These cables may be wrapped by or otherwise surrounded by flexible cable that provides a mechanical connectivity between the ground unit and the aerial unit.

The flexible cable is expected to physically tie and secure the aerial unit and electrically connect the ground unit and the aerial unit for power supply and communication. The aerial unit and the flexible cable do not require a special vehicle for support, as any van or relatively light vehicle can be adequate. Lighter versions of the system can even be carried by a person and even installed inside a backpack.

The flexible cable (once fully released) may be of 30 m length in order to get a good observation but other lengths may be used too. The average lifting and landing time of the aerial unit is around 10 seconds. The aerial unit may be configured to hold a payload of 1 to 5 kilos (although heavier or lighter payloads may be lifted by the aerial unit), may have a low heat emission and may barely generate noise. It is noted that flexible cables of other lengths may be used.

The base 202 is for receiving aerial unit and even for storing the aerial unit when the aerial unit is at its lowest position (ground position).

The ground unit controller 203 is for controlling the connecting element manipulator 201.

The ground unit 200 also include a positioning unit 230 that is arranged to image the aerial unit and to generate metadata about a location of the aerial unit. The position unit is illustrates in FIG. 1 as including video camera 232 and an image processor 238. It may include multiple video cameras (as illustrated in FIGS. 2 and 7). The metadata can refer to the location of the aerial unit, to the orientation of the aerial unit of both. It has been found that the image processing can be simplified by having the single video camera detect the location of the aerial unit while an orientation sensor (370 of FIG. 3) can detect the orientation of the aerial unit.

According to various embodiment of the invention various aerial units 300, 302 and 304 are provided. These aerial units may differ from each other by the number of propellers (second propeller 330, additional propellers 340, 342, 344 and 346 as their propeller motors), the existence of an orientation sensor 370, the manner in which payload is connected (to the aerial unit or to the connecting element 400), manner in which the additional propellers (if exist) converge when the aerial unit is in a close position, the number, shape and size of the additional propellers and the like, the type of electronic circuitry that is included in the aerial unit—from a controller to having only control wires and power lines the convey power and instructions to the various propeller motors.

Any of the aerial units 300, 302 and 304 may include (a) a first propeller 310, (b) a frame 320, (c) a first propeller motor 312 that is configured to rotate the first propeller 310 about a first axis, wherein the first propeller motor 312 is connected to the frame 320, and (d) at least one steering element. The at least one steering element can be a second propeller 330, one or more additional propellers 340, 342, 344 and 346 or any other steering element such as movable shelves.

At least one of the ground unit 200 and the aerial unit 300, 302 and 304 may include a controller (such as controller 500) that is arranged to control, at least in response to the metadata, at least one of the first propeller motor 312 and the at least one steering element to affect at least one of the location of the aerial unit 300, 302 and 304 and the orientation of the aerial unit 300, 302 and 304.

For simplicity of explanation controller 500 is illustrated as being a part of the ground unit 200 but this is not necessarily so.

As indicated above, the positioning unit may include a single video camera (232), multiple video cameras (232, 234) and at least two optical axes of at least two video cameras are oriented in relation to each other.

Figure 1:
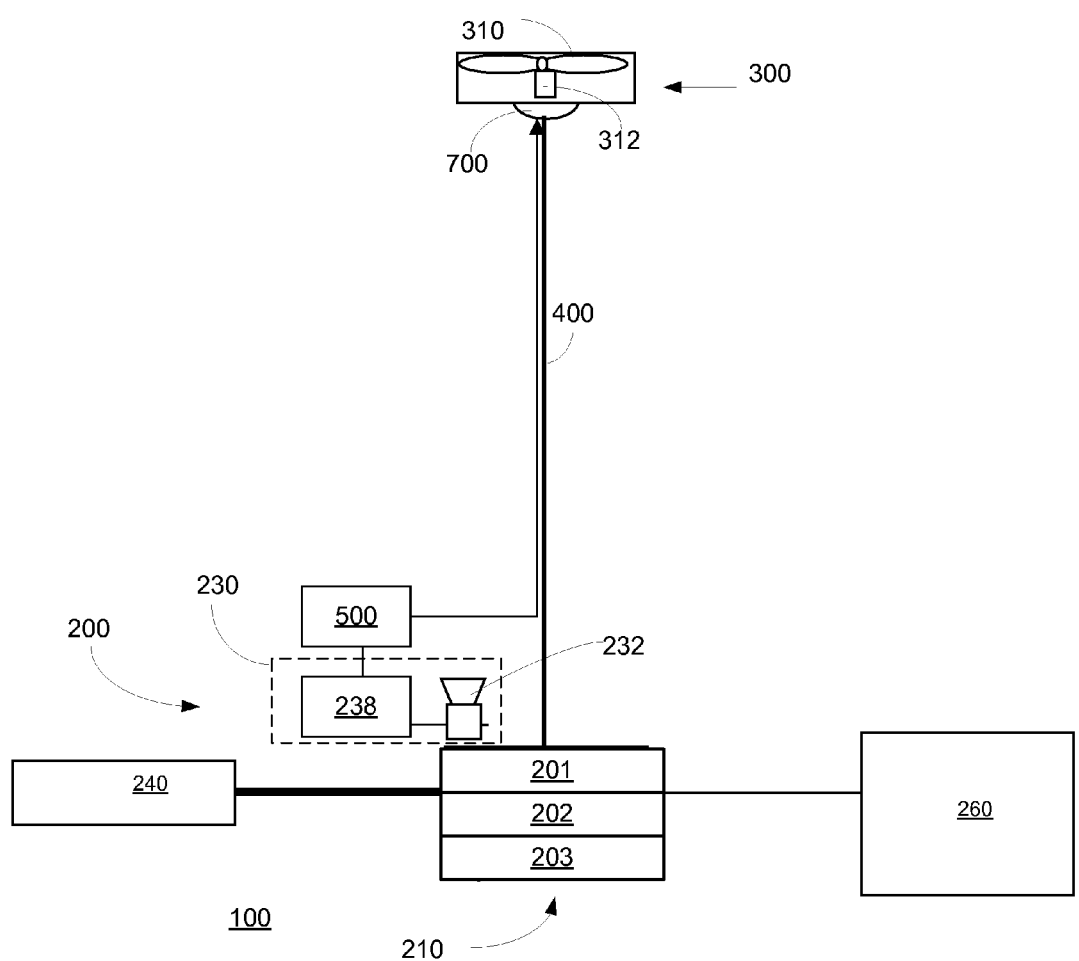
FIG. 1 is a general view of a system according to an embodiment of the invention.

The video camera 232 can be proximate to point in which the connecting element 400 is connected to the ground unit—as shown, for example, in FIG. 1.

The video camera can be remotely positioned from the connecting element manipulator 201.

The image processor 238 may be arranged to determine a location of the aerial unit in relation to a desired location, and generate location metadata indicative of position corrections that should be made to position the aerial unit at the desired location. The location metadata can include positioning commands, the desired correction to be applied in order to return the aerial unit to a desired rotation and the like.

FIG. 7 illustrates a connector 410 (such as a joint) that couples the flexible cable 400 to the aerial unit 300, 302 and 304 while allowing the aerial unit 300, 302 and 304 to move in relation to the flexible cable 400.

FIG. 7 further illustrates an interface electronic unit 420 that is positioned below the connector 410 and is arranged to send power and commands to the first motor. The interface electronic unit 420 can send commands to the various propeller motors in a format that is compliant to the formal acceptable by these various propeller motors. Placing the interface electronic unit 420 outside the aerial unit and without being supported by the aerial unit reduced the weigh of the aerial unit and makes it easier to steer and manipulate.

FIGS. 4 and 7-11 illustrates a second propeller 330 that is arranged to rotate about a second axis; wherein the first and second axes are concentric. Yaw steering of the aerial unit can be facilitated by controlling the thrust of each of the first and second propellers 310 and 330, as illustrates by arrow 930 of FIG. 9.

The frame 320 at least partially surrounds the first propeller 310.

According to an embodiment of the invention the system includes additional propellers 340, 342, 344 and 346, as well as additional propeller motors 350, 352, 354 and 356 that are arranged to rotate the additional propellers.

Each additional propeller is positioned outside the frame 320. The controller 500 mat be further arranged to control the additional propeller motors.

The additional propellers may be are arranged in a symmetrical manner around the first propeller 310.

The additional propellers 340, 342, 344 and 348 may be smaller than the first propeller 310.

The various propeller motors can be independently controlled by the controller 500. The controller 500 can independently control at least two of the propeller motors. Thus, the thrust and the direction of such motors can differ from each other.

Figure 9:
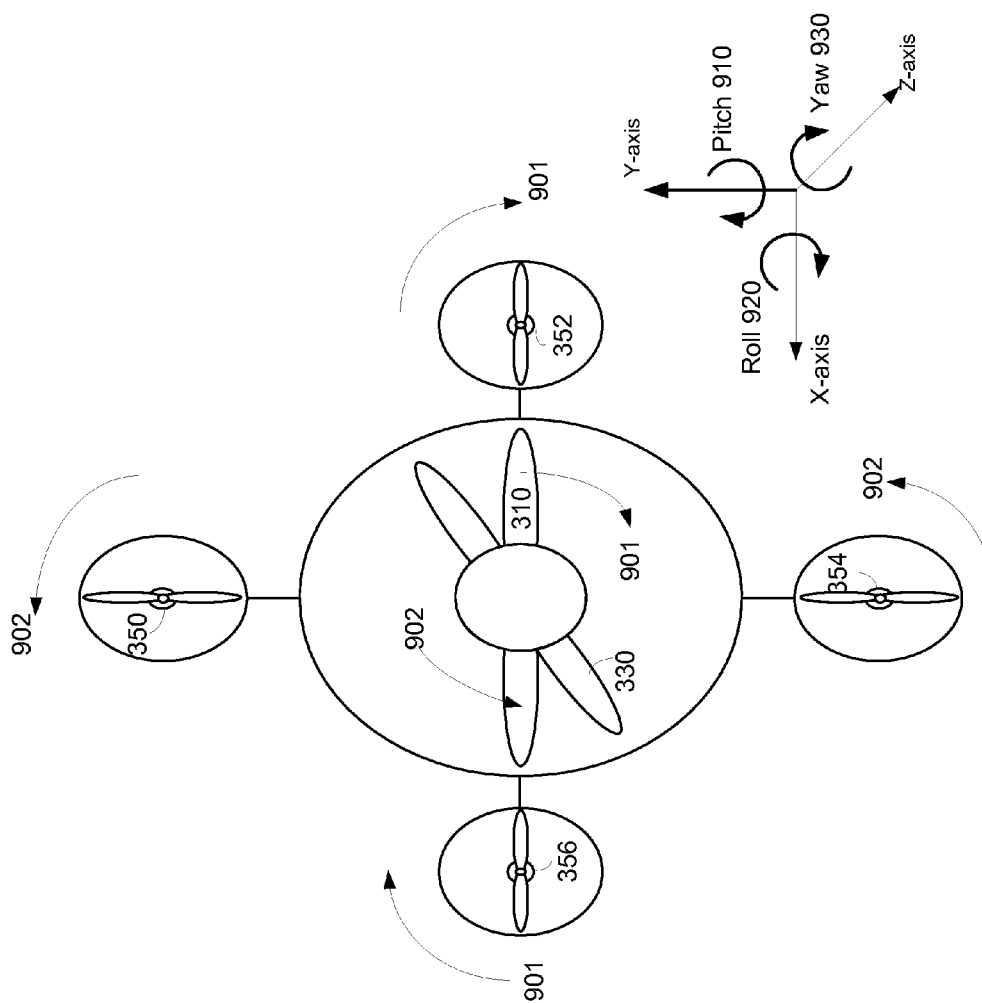
FIG. 9 is a general view of an aerial unit of a system according to an embodiment of the invention.

The controller 500 can be arranged to control one additional propeller motor to rotate in a clockwise manner and control another additional propeller motor to rotate in a counterclockwise manner. FIG. 9 illustrates three propellers that rotate clockwise (920) and three other propeller that rotate counterclockwise (901).

The controller 500 may alter at least one of a location and an orientation of the aerial unit 302, 304 by controlling a thrust of at least two propellers of a group of propellers that includes the additional propeller and the first propeller.

The controller 500 may perform yaw steering by controlling the first propeller 310 and at least one steering element (such as second propeller 330) that differs from the additional propellers.

The controller 500 may perform pitch (910) and roll (920) steering by controlling at least two additional propellers.

The controller 500 may be arranged to control (by sending control signals) a change of at least one of a location and orientation of the aerial unit by altering at least one thrust of at least one propeller of the group while maintaining directions of rotation of the propellers of the group unchanged. An example is provided in FIG. 9- the direction of rotation remains unchanged. The following table illustrates a relationship between thrust differences and their meaning

| | |
|---|---|
| Difference between thrust of first and second propellers 310 and 330 | Yaw steering (rotation about z-axis) |
| Difference between thrust of first and third additional propellers 340 and 344 | Roll steering (rotation about x-axis) |
| Difference between thrust of second and fourth additional propellers 342 and 346 | Pitch steering (rotation about y-axis) |

For example, referring to the example set forth in FIG. 9, allowing the first propeller 310 to develop more thrust than the second propeller 330 will cause the aerial unit to rotate clockwise. Allowing the first additional propeller 340 to develop more thrust than the third additional propeller 330 will cause the aerial unit to rotate within an imaginary Y-Z plane, wherein the rotation starts by lowering the third additional propeller 330 while elevating the first additional propeller.

Figure 5:
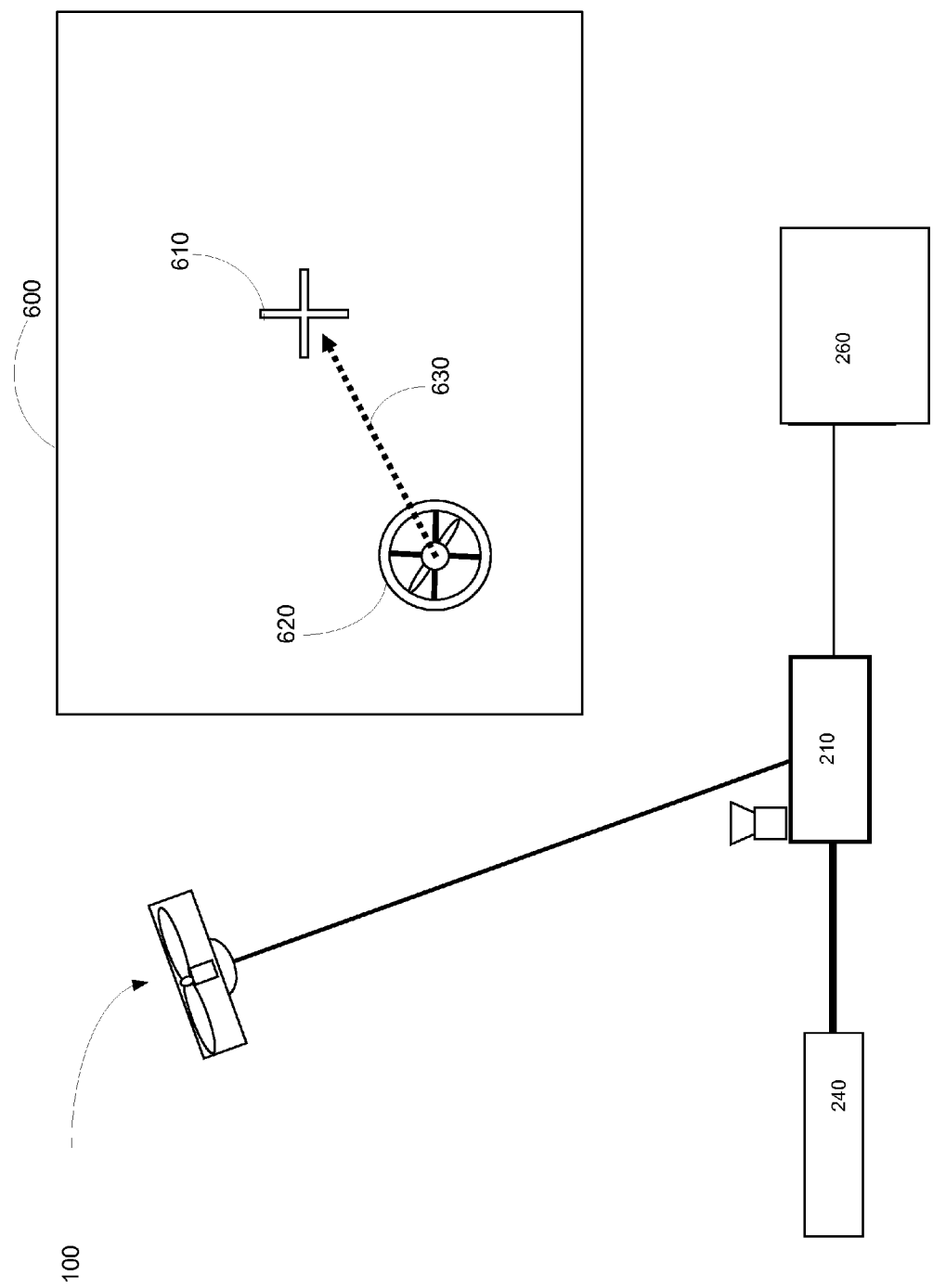
FIG. 5 is a general view of a system and of a field of view of a video camera according to an embodiment of the invention.

Various types of steering can be applied in order to set the aerial unit at a desired location, a desired orientation or both. If, for example, the wind causes the aerial unit to drift to a certain location the steering can be applied to counter that drift. FIG. 5 illustrates a field of view 600 of video camera 232, a current location 620 of the aerial unit, a desired location 610 of the aerial unit and a vector 630 that represents the desired location correction action.

Yet for another example, the steering can be applied in order to allow the aerial unit to fulfill a predefined flight pattern such as a scan pattern in which the aerial unit is directed along a scan patters thus allowing its payload to change its field of view according to a desired pattern.

The additional propeller motors 350, 352, 354 and 356 and the additional propellers 340, 342, 344 and 346 may be positioned outside the frame 320. The additional propeller motors 350, 352, 354 and 356 may be connected to additional frames 360, 362, 364 and 366. The additional frames 321, 322, 324 and 326 can be are coupled to the frame 320 by coupling elements 360, 362, 364 and 366 that allow movement between the frame 320 and the additional frames.

This movement is required to facilitate the aerial unit to move between an open configuration (FIG. 9, left side of FIG. 10 and upper portion of FIG. 11) to a close configuration (right side of FIG. 10 and lower portion of FIG. 11). The coupling elements can be rods, arms, or any structural element that facilitates such movement.

When the additional frames are in an open condition the additional frames 321, 322, 324 and 326 and the frame 320 do not overlap and when the additional frames 321, 322, 324 and 326 are in a close condition the additional frames 321, 322, 324 and 326 and the frame 320 overlap.

The additional frames can change their position from a horizontal position to a vertical position—when moving from an open position to a closed position—as illustrated in FIG. 11, and especially by dashed arrows 940.

Additionally or alternatively, the movement from a closed position to an open position can take place in a horizontal plane- as illustrated by dashed arrows 930 of FIG. 10.

The aerial unit can be in a closed position when proximate to the ground unit (at the beginning of the elevation process and at the end of the landing process). This can be done by activating motors that change the spatial relationship between the frame and the additional frames or by deactivating the additional propellers at the appropriate time.

Various figures such as FIGS. 1-5, illustrate the ground unit 200 as including a power source 240 and a user interface 260 that can allow a user to affect the control scheme—for example by determining the desired location. The user interface 260 may include a joystick (or other man machine interface) for receiving positioning commands and, additionally or alternatively, for displaying the location of the aerial unit in relation to the desired location.

The power provided to the aerial unit can also be utilized for powering the payload 700.

The ground unit 200 may be positioned on a vehicle such as a van and aerial unit that holds a payload (such as one or more types of equipment) and can lift itself to heights of about thirty meters within approximately ten seconds. It is noted that the aerial unit can lift the equipment to heights that differ from thirty meters and during a period that differs than ten seconds.

The system does not require a physical support for the aerial unit that performs the observation from the heights, since the aerial unit supports itself. Thus—the flexible cable can be light weighted since it doesn't need to support aerial unit.

Figure 12:
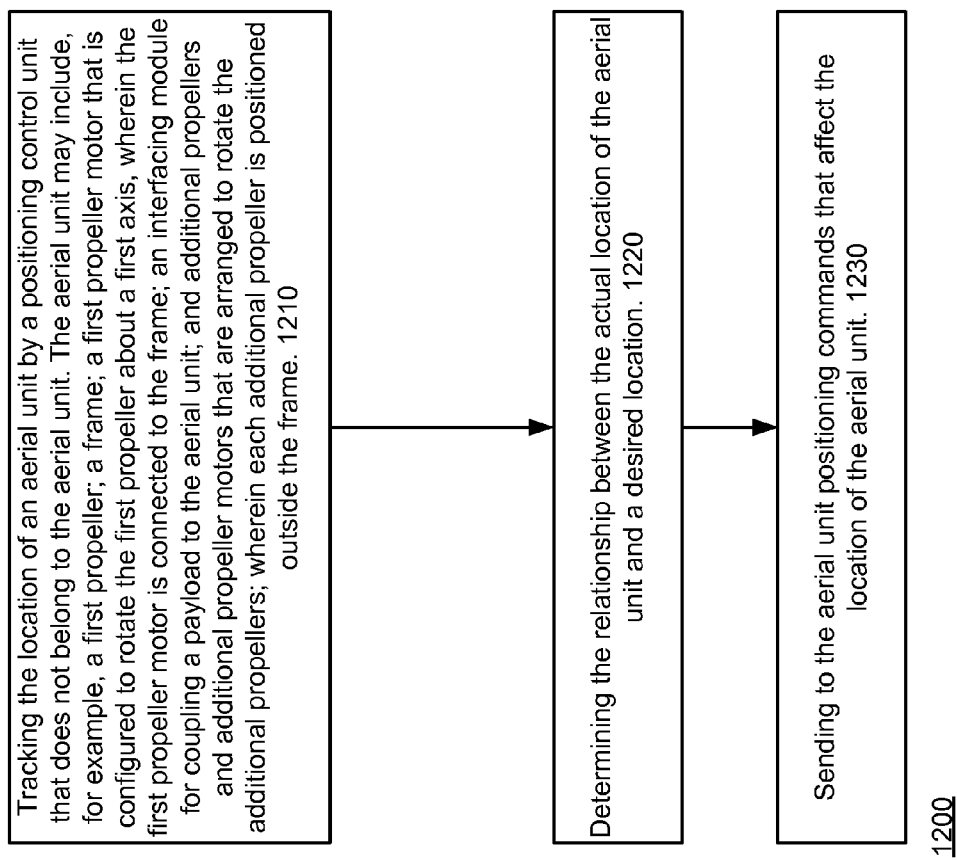
FIG. 12 is a flow chart of a method according to an embodiment of the invention.

FIG. 12 illustrates method 1200 according to an embodiment of the invention.

Method 1200 may start by stage 1210 of tracking the location of an aerial unit by a positioning control unit that does not belong to the aerial unit.

Stage 1210 may be followed by stage 1220 of determining the relationship between the actual location of the aerial unit and a desired location.

Stage 1220 may be followed by stage 1230 of sending to the aerial unit positioning commands that affect the location of the aerial unit. The aerial unit may belong to a system as illustrated above. It may include, for example, a first propeller; a frame; a first propeller motor that is configured to rotate the first propeller about a first axis, wherein the first propeller motor is connected to the frame; an interfacing module for coupling a payload to the aerial unit; and additional propellers and additional propeller motors that are arranged to rotate the additional propellers; wherein each additional propeller is positioned outside the frame.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

We claim:

1. A system, comprising: a ground unit; an aerial unit; and a connecting element arranged to connect the ground unit to the aerial unit;

wherein the ground unit comprises: a connecting element manipulator, for altering an effective length of the connecting element; wherein the effective length of the connecting element defines a distance between the ground unit and the aerial unit; a ground unit controller for controlling the connecting element manipulator; and a positioning unit arranged to image the aerial unit and to generate metadata about a location of the aerial unit;

wherein the aerial unit comprises: a first propeller; a frame; a first propeller motor that is configured to rotate the first propeller about a first axis, wherein the first propeller motor is connected to the frame; and at least one steering element;

wherein at least one of the ground unit and the aerial unit comprises a controller that is arranged to control, at least in response to the metadata, at least one of the first propeller motor and the at least one steering element to affect at least one of the location of the aerial unit and the orientation of the aerial unit;

wherein the frame at least partially surrounds the propeller;

wherein the system further comprises additional propellers, additional frames and additional propeller motors that are arranged to rotate the additional propellers; wherein the additional frames at least partially surround the additional propellers;

wherein the additional frames are coupled to the frame by coupling elements that facilitate a movement of the additional frames between an open configuration and a close configuration;

wherein when positioned at the open configuration each additional propeller is positioned outside the frame so that the frame does not overlap any of the additional frames;

wherein when positioned at the close configuration the additional propellers and the frame overlap;

wherein the controller is further arranged to control the additional propeller motors.

2. The system according to claim 1, wherein the additional propellers are arranged in a symmetrical manner around the first propeller.

3. The system according to claim 1, wherein the additional propellers are smaller than the first propeller.

4. The system according to claim 1, where the additional propeller motors and the first propeller motor form a group of propeller motors; and wherein the controller is arranged to independently control at least two propeller motors out of the group of propeller motors.

5. The system according to claim 1, wherein the controller is arranged to independently control each propeller motor of the group of propeller motors.

6. The system according to claim 1, wherein the controller is arranged to control one additional propeller motor to rotate in a clockwise manner and control another additional propeller motor to rotate in a counterclockwise manner.

7. The system according to claim 1, wherein the at least one steering element comprises the additional propellers.

8. The system according to claim 1, wherein the controller is arranged to alter at least one of a location and an orientation of the aerial unit by controlling a thrust of at least two propellers of a group of propellers that comprises the additional propeller and the first propeller.

9. An aerial unit, comprising:
a first propeller;
a frame;
a first propeller motor that is configured to rotate the first propeller about a first axis, wherein the first propeller motor is connected to the frame;
an interfacing module for coupling a payload to the aerial unit;
additional propellers, additional frames and additional propeller motors that are arranged to rotate the additional propellers;
wherein the additional frames at least partially surround the additional propellers;
wherein the additional frames are coupled to the frame by coupling elements that facilitate a movement of the additional frames between an open configuration and a close configuration;
wherein when positioned at the open configuration each additional propeller is positioned outside the frame so that the frame does not overlap any of the additional frames;
wherein when positioned at the close configuration the additional propellers and the frame overlap.

10. The aerial unit according to claim 9, wherein the additional propellers are arranged in a symmetrical manner around the first propeller.

11. The aerial unit according to claim 9, wherein the additional propellers are smaller than the first propeller.

12. The aerial unit according to claim 9, where the additional propeller motors and the first propeller motor form a group of propeller motors; and wherein the aerial unit comprises a controller that is arranged to independently control at least two propeller motors out of the group of propeller motors.

13. The aerial unit according to claim 9, wherein the aerial unit comprises a controller that is arranged to independently control each propeller motor of the group of propeller motors.

14. The aerial unit according to claim 9, wherein the aerial unit comprises a controller that is arranged to control one additional propeller motor to rotate in a clockwise manner and control another additional propeller motor to rotate in a counterclockwise manner.

15. The aerial unit according to claim 9, wherein the aerial unit comprises a controller that is arranged to alter at least one of a location and an orientation of the aerial unit by controlling a thrust of at least two propellers of a ground of propellers that comprises the additional propeller and the first propeller.

* * * * *